United States Patent
Batchu et al.

(10) Patent No.: US 11,429,802 B2
(45) Date of Patent: Aug. 30, 2022

(54) OBTAINING DEVICE POSTURE OF A THIRD PARTY MANAGED DEVICE

(71) Applicant: MOBILEIRON, INC., Mountain View, CA (US)

(72) Inventors: Suresh Kumar Batchu, Campbell, CA (US); Mohammad Aamir, San Jose, CA (US)

(73) Assignee: MOBILEIRON, INC., South Jordan, UT (US)

( * ) Notice: Subject to any disclaimer, the term of this patent is extended or adjusted under 35 U.S.C. 154(b) by 482 days.

(21) Appl. No.: 16/569,182

(22) Filed: Sep. 12, 2019

(65) Prior Publication Data

US 2021/0081632 A1 Mar. 18, 2021

(51) Int. Cl.
- *H04L 9/40* (2022.01)
- *G06K 7/14* (2006.01)
- *H04W 4/80* (2018.01)
- *H04W 60/04* (2009.01)

(52) U.S. Cl.
CPC ........ *G06K 7/1417* (2013.01); *H04L 63/0838* (2013.01); *H04W 4/80* (2018.02); *H04W 60/04* (2013.01)

(58) Field of Classification Search
CPC ...... G06K 7/1417; H04W 4/80; H04W 60/04; H04L 63/0838
USPC .......................................................... 726/7
See application file for complete search history.

(56) References Cited

U.S. PATENT DOCUMENTS

| | | | | |
|---|---|---|---|---|
| 10,122,761 | B2* | 11/2018 | Newell | ................ H04L 63/166 |
| 2005/0033994 | A1* | 2/2005 | Suzuki | ............... H04N 21/6582 348/E7.071 |
| 2013/0173915 | A1 | 7/2013 | Haulund | |
| 2014/0064511 | A1* | 3/2014 | Desai | ...................... H04R 3/12 381/74 |
| 2014/0189808 | A1 | 7/2014 | Mahaffey | |
| 2014/0357253 | A1 | 12/2014 | Laudermilch | |
| 2015/0026074 | A1* | 1/2015 | Cotten | ................ G06Q 30/012 705/302 |
| 2016/0044511 | A1* | 2/2016 | Broch | ................ H04L 63/0853 726/4 |
| 2016/0127331 | A1* | 5/2016 | Liu | ...................... H04L 9/0822 713/171 |
| 2016/0278187 | A1* | 9/2016 | Amer | ..................... H05B 47/19 |
| 2016/0371630 | A1* | 12/2016 | Jetcheva | ............ G06Q 30/0625 |
| 2017/0278070 | A1* | 9/2017 | Desai | ................ G06Q 10/1095 |
| 2017/0278103 | A1* | 9/2017 | Cheong | ............. G06Q 20/3821 |
| 2017/0302460 | A1 | 10/2017 | Song | |
| 2019/0068592 | A1* | 2/2019 | Mattela | ............... H04L 63/0876 |

\* cited by examiner

*Primary Examiner* — Michael S McNally

(74) *Attorney, Agent, or Firm* — Van Pelt, Yi & James LLP

(57) ABSTRACT

Techniques are disclosed to obtain device posture of a third party managed device. In various embodiments, a unique identifier of the third party managed device is embedded in a registration communication sent from a third party managed device to an access node associated with a first party management entity. The registration communication is sent from the third party managed device to the access node. The access node is configured to store data associating the unique identifier with the third party managed device, and to use the unique identifier to obtain from the third party management entity device posture information for the third party managed device.

18 Claims, 4 Drawing Sheets

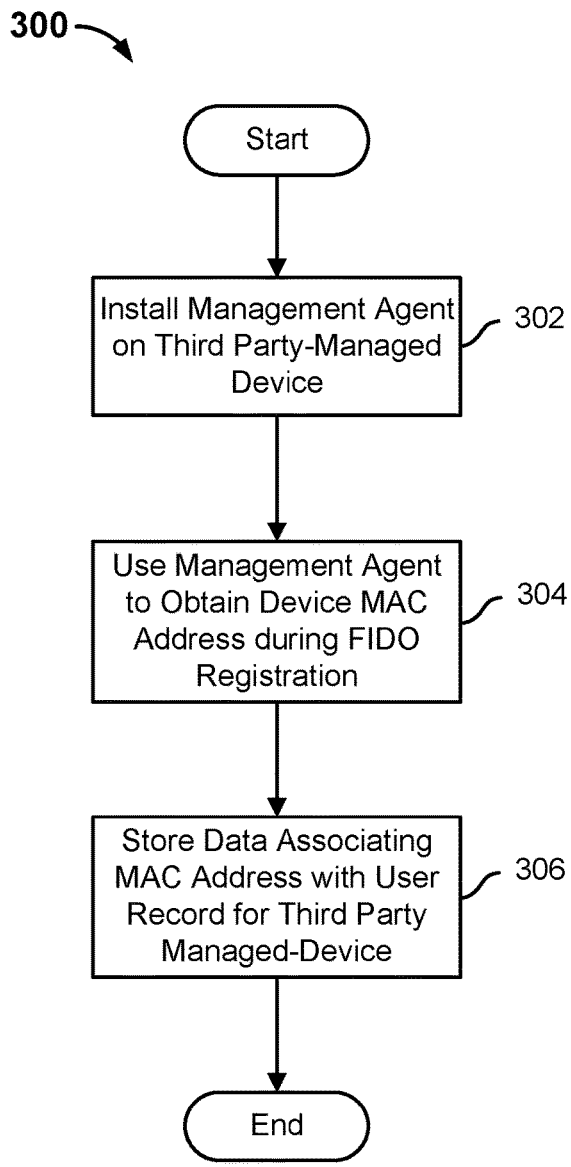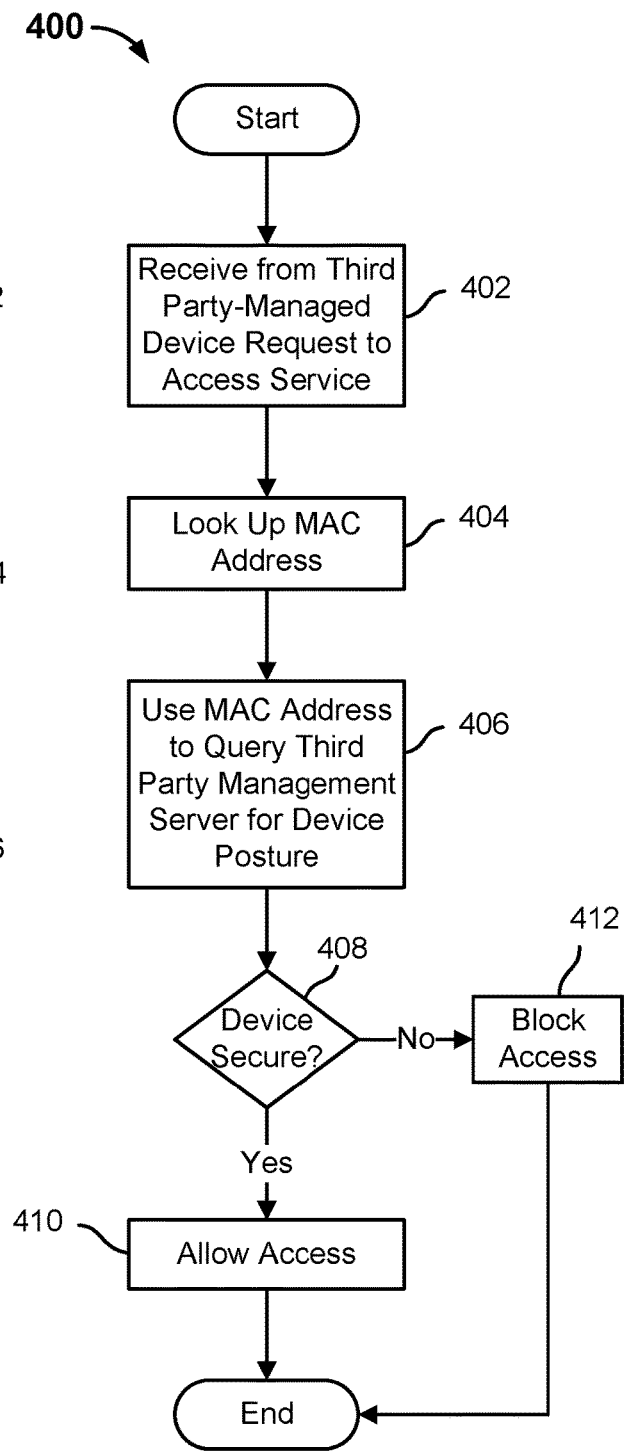
FIG. 3
FIG. 4

OBTAINING DEVICE POSTURE OF A THIRD PARTY MANAGED DEVICE

BACKGROUND OF THE INVENTION

An enterprise or other entity may use more than one vendor and/or product to provide security with respect to devices used to access the entity's network-based resources, such as cloud services. For example, one vendor may be used to provide security with respect to desktop and/or laptop computers, while a different vendor may be used to maintain the security of mobile devices.

Modern mobile devices increasingly include functionality to provide access based on biometric input provide by a user via a sensor comprising the mobile device, such as face recognition, voice recognition, fingerprint, etc. Techniques have been developed to provide secure access to cloud-based services and other resources based at least in part on such user verification.

A first party mobile device-based security solution may be used to provide access to resources via a third party managed device. For example, techniques are known to use a first party managed mobile device to verify user identity and authorization for access to a protected resource to be provided via a third party managed device. However, prior techniques do not check/ensure the security posture of the third party managed device in connection with using the first party solution to providing access to a resource via the third party managed device.

BRIEF DESCRIPTION OF THE DRAWINGS

Various embodiments of the invention are disclosed in the following detailed description and the accompanying drawings.

FIG. 3 is a flow chart illustrating an embodiment of a process to obtain and store a physical address associated with a third party managed device.

FIG. 4 is a flow chart illustrating an embodiment of a process to use a previously-stored physical address to obtain device posture of a third party managed device.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to verify the security posture of a third party managed device in connection with using a first party managed device and associated first party security solution to provide access to a resource. In various embodiments, the first party solution learns and stores an identifier usable to obtain device posture information from the third party management entity, such as a physical (e.g., MAC) address of the third party managed device. In various embodiments, the identifier is a MAC address obtained and stored in connection with Fast Identity Online (FIDO) registration and/or other security protocols and/or registration processes. The stored identifier is used to obtain device posture of the third party managed device, e.g., by using the identifier to query the third party management server to obtain device posture information.

Figure 1:
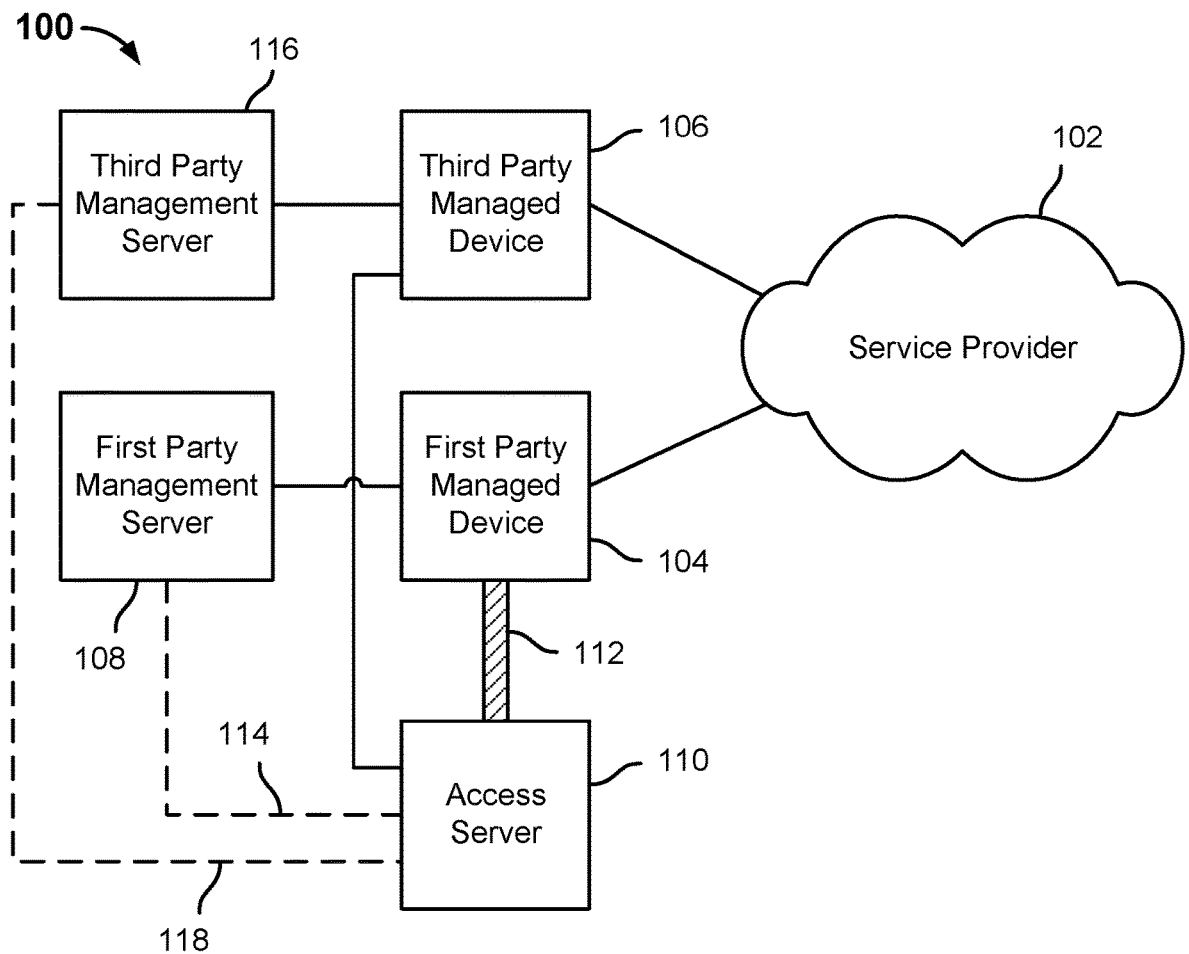
FIG. 1 is a block diagram illustrating an embodiment of a system to obtain device posture of a third party managed device.

FIG. 1 is a block diagram illustrating an embodiment of a system to obtain device posture of a third party managed device. In the example shown, system 100 provides secure access to a cloud-based service provider 102 via first party managed device 104 and third party managed device 106. For example, without limitation, first party managed device 104 may be a mobile device managed by a first management provider and third party managed device 106 may be a desktop or laptop computer managed by a third party management provider.

In this example, first party managed device 104 is managed at least in part by a first party management server 108. A mobile device management (MDM) or other enterprise mobility management (EMM) app or agent on the first party managed device 104 communicates with the first party management server 108. The MDM/EMM app or agent may be used to control operation of first party managed device 104, e.g., in response to policies, configurations, commands, etc. received from first party management server 108. The MDM/EMM app or agent on first party managed device 104 may also be used to report device and/or security posture information (e.g., app inventory, whether jailbroken, etc.) to first party management server 108.

In various embodiments, access to service provider 102 is provided via first party managed device 104 under control of access server 110 based at least in part on device posture information obtained from first party management server 108. A user of device 104 opens a service provider app on device 104 and selects an option to access service provider 102. Service provider 102 is configured to redirect the access request to access server 110. Device 104 is connected to access server 110 via a device level VPN 112. The connection via device level VPM 112 provides a secure way for device 104 and access server 110 to communicate. Access server 110 associates communications received via device level VPN 112 with device 104 and/or a user associated with device 104. Access server 110 verifies the device posture of device 104 through communications via a connection 114 to first party management server 108. For example, access server 110 may communicate with first party management server 108 via connection 114 to verify the device posture of device 104 in connection with establishing the connection via device level VPN 112 and/or at the time an access request is received and processed, such as a request to access service provider 102.

In various embodiments, access server 110 obtains posture data for device 104 from first party management server 108 using device information, such as a MAC address or other physical address, of device 104. The access server 110 knows the physical address of device 104 as result of the association between device level VPN 112 and device 104.

Referring further to FIG. 1, upon verify the device posture of device 104, access server 110 provides a token or other access credential to device 104 to be presented to service provider 102 to obtain access.

In the example shown in FIG. 1, third party managed device 106 is managed by a third party management server 116. In various embodiments, a request by the same user in the example above to access service provider 102 but to do so via third party managed device 106 is redirected to access server 110. However, as shown, unlike first party managed device 104, third party managed device 106 is not connected to access server 110 via a device level VPN. In some embodiments, third party managed device 106 may not be configured to connect via a device level VPN with access server 110. For example, access server 110 may be associated with the first party management provider with which first party management server 108 is associate, and a device may be required to be under management by the same first party management entity, as device 104 is in this example, to be configured to connect to access server 110 via a device level VPN.

In some embodiments, access to service provider 102 via third party managed device 106 is provided at least in part by prompting the user to provide an indication via first party managed device 104 that access is authorized. For example, a push notification may be sent to first party managed device 104 asking the user to indicate whether the request (apparently from the same user) via device 106 to access service provider 102 is authorized. Or, in some embodiments, the user may be prompted via third party managed device 106 to indicate authorization to access service provider 102 by using device 104 to scan a QR code or other encoded data displayed via device 106.

In various embodiments, user authorization via VPN-connected first party managed device 104 to access service provider 102 using third party managed device 106, which is not connected by VPN to the access server 110 may be provided at least in part as disclosed in published U.S. patent application Ser. No. 15/595,648, entitled, "Unified VPN and Identity Based Authentication to Cloud-based Services," filed May 15, 2017 and published Nov. 16, 2017 at Publication No. US-2017-0331815-A1, the entire contents of which are incorporated herein by reference for all purposes.

In various embodiments, the above techniques may be used to verify that the request received from third party managed device 106 to access service provider 102 is associated with the authorized user of first party managed device 104. However, while the above techniques would be sufficient to verify the user it would not without more allow the access server 110 to verify the device posture (e.g., secure, properly configured, not reported lost/stolen, not jailbroken, not in a location or other context such that access to service provider 102 should be denied by policy, etc.)

In the example shown, access server 110 has a connection 118 to third party management server 116. Typically a unique identifier, such as a device MAC address, must be provided to obtain device posture information from a management server such as third party management server 116. However, the request from third party managed device 106 to access service provider 102, which in this example is redirected to access server 110, does not contain the MAC address (or other unique identifier) of the third party managed device 106.

In various embodiments, a software agent or other code of the first party management entity with which first party management server 108 and/or access server 110 is associated is installed on third party managed device 106. The first party agent (or code) is configured to send the MAC address of third party managed device 106 to access server 110 in connection with FIDO registration and/or registration communications sent under another security/authentication protocol. In various embodiments, at FIDO/other registration time, the user is prompted to launch the first party agent/code on the third party managed device. The user authenticates him/herself via a first party managed device, resulting in a one-time access (OTA) token (or other credential/data) being sent to the third party managed device. The first party agent/code on the third party managed device includes the MAC address of the third party managed device in a registration response (or other responsive communication) sent to the access server. The access server validates the access token, validates the registration response, and registers the third party managed device, including by storing the MAC address in the user/device record and/or otherwise associating the MAC address with the user/device record.

Referring further to FIG. 1, in some embodiments, access server 110 obtained and stored the MAC address of third party management device 106, e.g., in connection with FIDO registration, as described above. Upon receiving the redirected request from third party managed device 106 to access service provider 102, as described above, in various embodiments access server 110 uses the previously-obtained and stored MAC address of third party managed device 106 to query third party management server 116 for device posture information of device 106. If the device posture is verified as good, access is allowed. If not, access is denied.

Figure 2:
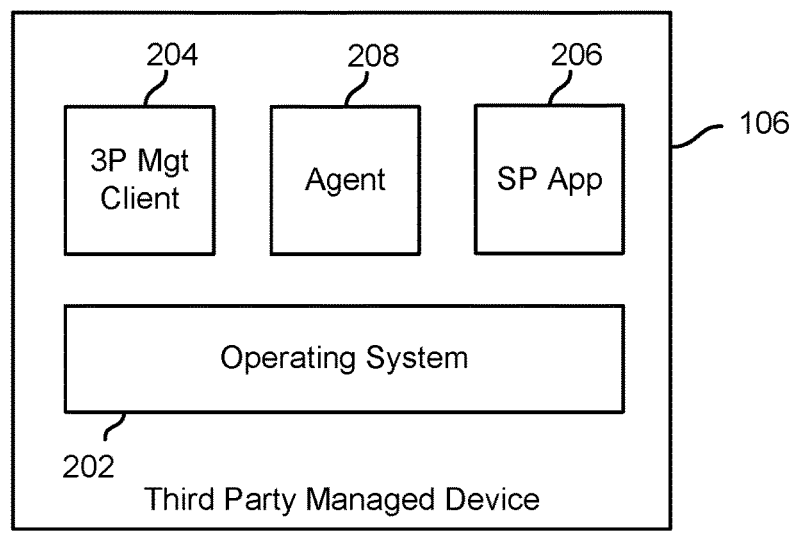
FIG. 2 is a block diagram illustrating an embodiment of a third party managed device.

FIG. 2 is a block diagram illustrating an embodiment of a third party managed device. In various embodiments, third party managed device 106 is implemented as shown in FIG. 2. In the example shown, third party managed device 106 includes an operating system 202 running on a hardware processor (not shown). Third party managed device 106 is managed at least in part via third party management client 204. In various embodiments, an administrative user, system, and/or process uses third party management client 204 to perform management functions with respect to third party managed device 106. In some embodiments, third party management client 204 is registered with and uses a mobile device management (MDM) or other native management functionality of operating system 202 to manage the third party managed device 106. Examples of device management include maintaining an inventory of applications (apps) installed on the device, ensuring only authorized apps are installed, ensuring unauthorized apps are not installed, reporting app inventory data to a remote management server, checking device posture including without limitation ensuring the configurations and settings conform to policy, checking and report configuration and settings, altering configuration and settings in response to a command or other data from a remote management server, ensuring unauthorized or otherwise unsecure apps do not access protected data, wiping data, apps, or other content in response to a remote command, detecting that the device has been jailbroken, etc.

Referring further to FIG. 2, third party managed device 106 includes a service provider app 206 comprising code to access an associated cloud-based service of a service provider, such as service provider 102 of FIG. 1. In various embodiments, a cloud-based service may be accessed user the third party managed device 106 via one or both of an app or other application, such as service provider app 206, and/or browser software.

In the example shown in FIG. 2, third party managed device 106 further includes a management agent 208. In some embodiments, management agent 208 may be provided by and/or otherwise associated with a first party management entity, e.g., an enterprise mobility management provider or other provider. In various embodiments, management agent 208 includes code to implement functionality as disclosed herein to interact with one or more of operating system 202, third party management client 204, and service provider app 206 to facilitate secure access of a cloud-based service via the third party managed device 106, including by using an access node associated with the first party management entity, such as access server 110 in the example shown in FIG. 1, to obtain device posture information regarding the third party managed device 106 from a third party management server, such as third party managed server 116 of FIG. 1. In various embodiments, management agent 208 implements techniques disclosed herein to obtain MAC or other physical address data of the third party managed device 106, e.g., in connection with FIDO registration and/or completion of other authentication/registration/security protocols.

In various embodiments, management agent 208 sends MAC address information of the third party managed device 106 to an access node associated with a first party management entity (e.g., vendor) with which the management agent 208 is associated. The first party managed access node (e.g., access server 110) is configured to store data that associates the MAC address with the third party managed device 106. Upon receiving a subsequent request from the third party managed device 106 to access the cloud-based service, in various embodiments the first party managed access node looks up the MAC address and queries the third party management server to obtain device posture information for the third party managed device 106 prior to authorizing access (or not) to the service.

In some embodiments, management agent 208 obtains the MAC address of the third party managed device 106 in connection with FIDO registration of the third party managed device 106 by an authorized user. Upon successful completion of the FIDO registration, the management agent 208 publishes itself as a FIDO Authenticator. In various embodiments, to access the service via the third party managed device in the future, once the management agent 208 has published itself as a FIDO Authenticator, the user is not required to enter the password but instead can use biometric based authentication and the user is locally authenticated before letting the server know that the user has been authenticated.

FIG. 3 is a flow chart illustrating an embodiment of a process to obtain and store a physical address associated with a third party managed device. In various embodiments, process 300 is performed by one or more of a first party management server, a third party management server, a third party management agent, and/or one or more authorized (e.g., administrative) users of a third party managed device and/or a management agent and/or server. In the example shown, at 302 a management agent, such as management agent 208 of FIG. 2, is installed on a third party managed device, such as third party managed device 106. At 304, the management agent is used to obtain the MAC (or other physical) address of the third party managed device. In some embodiments, the MAC address is obtained in part by launching the management agent and/or initiating FIDO registration. In some embodiments, the management agent is launched by a user of the third party managed device opening the management agent. In some embodiments, the management agent is launched by a JavaScript or other client, e.g., in response to the user accessing a cloud-based service for the first time and upon timeout from the Authenticator or getting no Authenticator in GetInfo Client to Authenticator Protocol (CTAP) call.

In various embodiments, once launched the management agent prompts the user to use a first party managed device, such as first party managed device 104 of FIG. 1, to initiate authentication with an access node associated with the first party management entity (vendor, service, etc.) with which the management agent and/or the first party managed device are associated, such as access server 110 in the example shown in FIG. 1. In response to authentication messages exchanged with the first party managed device, the access node sends a one-time access (OTA) token to the first party agent running on the third party managed device, which uses the token to initiate FIDO (or other) registration with the access node. In various embodiments, the management agent sends a registration response to the access node which includes in the response, e.g., in a custom or unused, other client data, etc., the MAC address of the third party managed device. At 308, the access node receives the response and stores data associating the MAC address with registration data of the third party managed device.

FIG. 4 is a flow chart illustrating an embodiment of a process to use a previously-stored physical address to obtain device posture of a third party managed device. In various embodiments, the process 400 is implemented by an access node associated with a first party management entity (service, vendor, etc.), such as access server 110 of FIG. 1. In the example shown, at 402 a request is received from a third party managed device, e.g., third party managed device 106 of FIG. 1, to access a service, such as service provider 102 of FIG. 1. At 404, the MAC (or other physical) address of the third party managed device from which the request was received is looked up. In some embodiments, a public key associated with the request is used to look up the MAC address. For example, the access node (e.g., access server 110) looks up a MAC address of the third party managed device that was received and stored in connection with FIDO (or other) registration, as disclosed herein. At 406, the MAC address of the third party managed device is used to obtain device posture information for the third party managed device. For example, in various embodiments, the MAC address of the third party managed device is used to query a third party management server configured to manage the third party managed device, such as third party management server 116 of FIG. 1.

At 408, if the device posture information obtained at 406 indicates the third party managed device is/remains in a secure (or otherwise prescribed) state, access to the service is allowed at 410. For example, at 410 an access token or other credential to access the service is provided to the third party managed device. If the device posture information obtained at 406 indicates the third party managed device is not in a secure (or otherwise prescribed) state, access to the service is blocked at 412.

Figure 5:
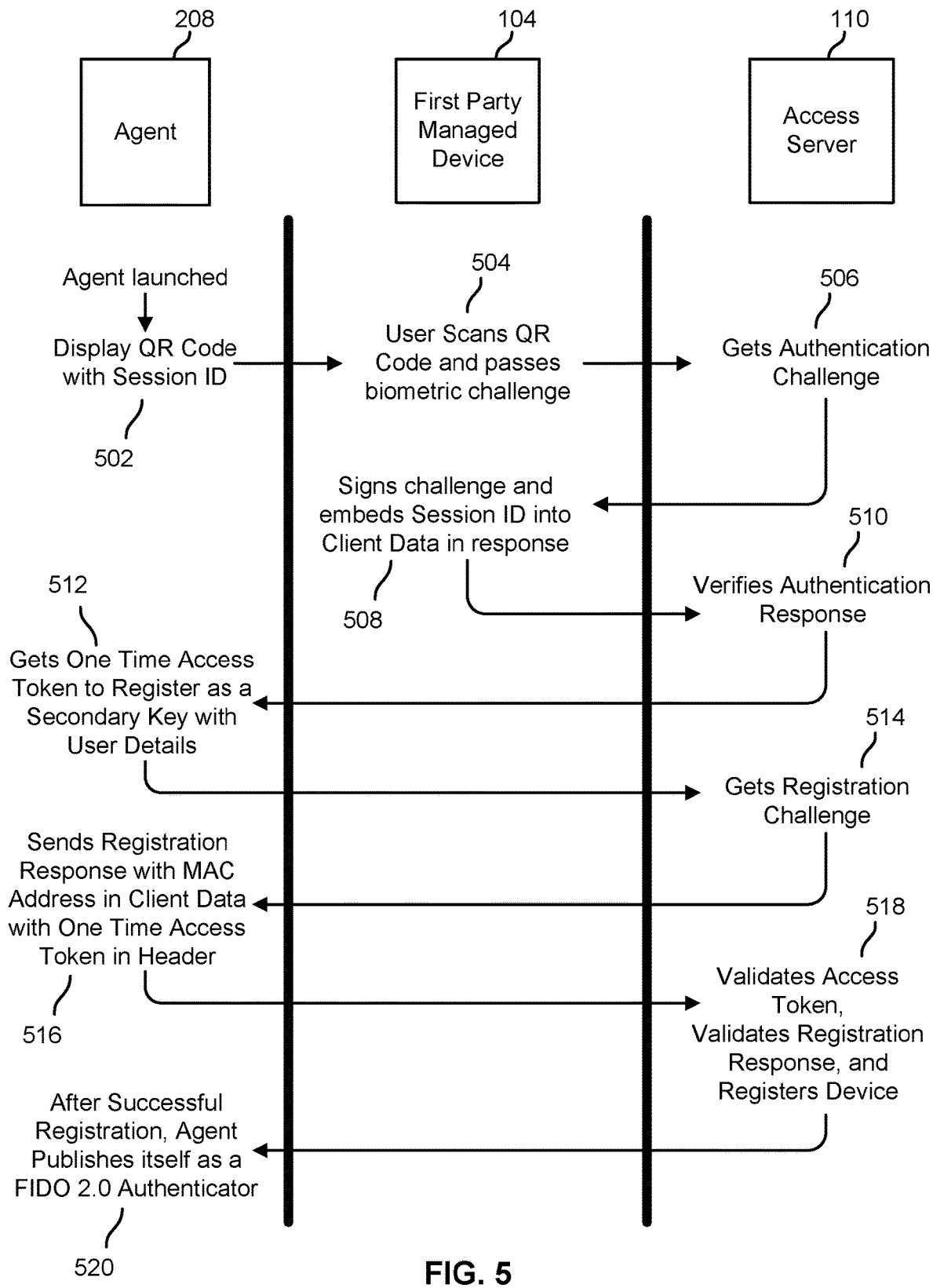
FIG. 5 is a network communication flow diagram illustrating an embodiment of a system and process to obtain device posture of a third party managed device.

FIG. 5 is a network communication flow diagram illustrating an embodiment of a system and process to obtain device posture of a third party managed device. In the example shown, at 502 a first party agent 208 is launched and displays on a display device of a third party managed device on which the first party agent 208 is installed a QR or other computer-readable code that encodes a session identifier (Session ID). In some embodiments, the management agent 208 is launched by a user of the third party managed device opening the management agent. In some embodiments, the management agent is launched by a JavaScript or other client, e.g., in response to the user accessing a cloud-based service for the first time and upon timeout from the Authenticator or getting no Authenticator in GetInfo Client to Authenticator Protocol (CTAP) call. The user is prompted to use a first party managed device 104 associated with the user, such as a first party managed mobile phone or other mobile device, to scan the QR code displayed on the third party managed device. At 504, the user uses the first party managed device 104 to scan the QR code and the user is prompted to complete a biometric challenge. (In the example shown, user passes the biometric challenged.)

In the example shown, scanning the QR code and passing the biometric challenge result in the first party managed device 104 sending a get authentication challenge call to the access server 110. At 506, access server 110 receives the get authentication challenge and responds to the first party managed device 104, e.g., by sending a FIDO 2.0 authentication challenge. At 508, the first party managed device 104 signs the challenge and embeds in the Client Data portion of its authentication response (e.g., FIDO 2.0 assertion) the Session ID encoded in the QR code scanned at 504. At 510 the access server 110 verifies the authentication response and uses the Session ID to send a one-time access (OTA) token to the first party agent 208 on the third party managed device.

At 512, the first party agent 208 receives the OTA token and uses it to register as a secondary key with user details. In some embodiments, at 512 the first party agent sends a FIDO 2.0 get registration challenge call. At 514, the access server 110 receives the registration challenge from the management agent 208 and sends a responsive communication to the management agent 208. At 516, the management agent 208 sends to the access server 110 a registration response (e.g., FIDO 2.0 attestation) that includes the MAC (or other physical) address of the third party managed device and the OTA token received at 512. For example, in various embodiments, the MAC address is included in Client Data and the OTA token is included in the response header. At 518, the access server 110 validates the access token and the registration response and registers the third party managed device, including by including the MAC address in the registration record/data for the third party managed device. At 520, after successful registration, the management agent 208 publishes itself as a FIDO 2.0 Authenticator.

Figure 6:
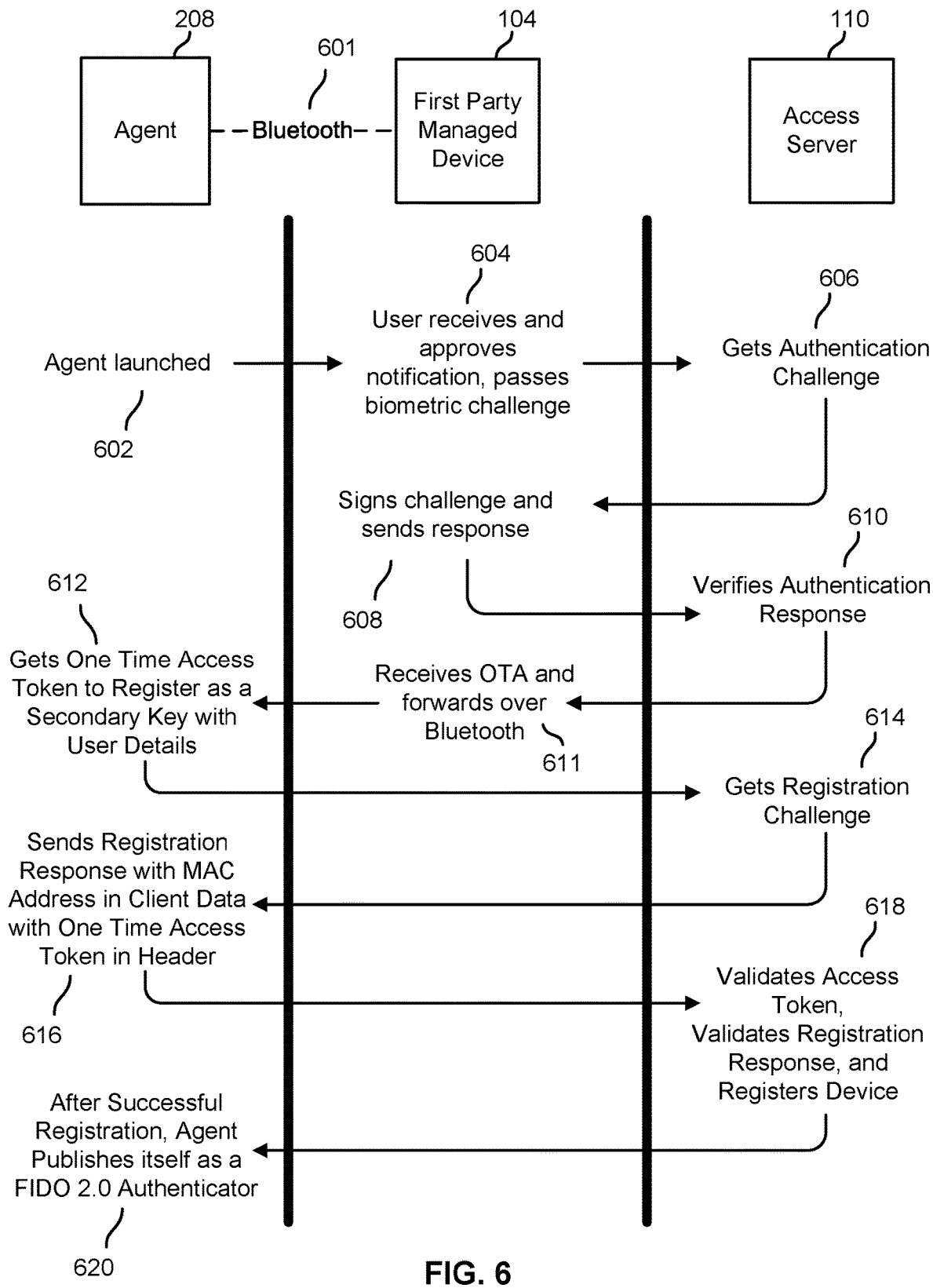
FIG. 6 is a network communication flow diagram illustrating an embodiment of a system and process to obtain device posture of a third party managed device.

FIG. 6 is a network communication flow diagram illustrating an embodiment of a system and process to obtain device posture of a third party managed device. In the example shown, the management agent 208 and first party managed device 104 are paired via a Bluetooth connection 601, enabling them to communicate via Bluetooth low energy (BLE) and/or other Bluetooth communications. At 602, the management agent 208 is launched (e.g., manually), as in 502 of FIG. 5 above. At 604, the user receives and approves at the first party managed device 104, for example via and/or in response to a BLE or other communication received from the management agent 208 running on the third party managed device, and the user (in this example) passes a biometric challenge. In response, the first party managed device sends an authentication challenge to the access server 110.

At 606, access server 110 receives the authentication challenge and responds to the first party managed device 104. At 608, the first party managed device 104 signs the challenge sends the response. At 610 the access server 110 verifies the authentication response and sends a one-time access (OTA) token to the first party managed device 104, which at 611 sends the OTA token via Bluetooth to the management agent 208 on the third party managed device.

At 612, the first party agent 208 receives the OTA token and uses it to register as a secondary key with user details. At 614, the access server 110 receives the registration challenge from the management agent 208 and sends a responsive communication to the management agent 208. At 616, the management agent 208 sends to the access server 110 a registration response that includes the MAC (or other physical) address of the third party managed device and the OTA token received at 612. For example, in various embodiments, the MAC address is included in Client Data and the OTA token is included in the response header. At 618, the access server 110 validates the access token and the registration response and registers the third party managed device, including by including the MAC address in the registration record/data for the third party managed device. At 620, after successful registration, the management agent 208 publishes itself as a FIDO 2.0 Authenticator.

While in the above examples the MAC address of a third party managed device is obtained in connection with FIDO registration, in various embodiments the MAC address may be obtained by a management agent running on a third party managed device and provided to an access node associated with the management agent in connection with one or more other authentication, registration, and/or security or communication protocols.

Using techniques disclosed herein, device posture of a third party managed device may be obtained by a first party management entity and used to provide secure access via the third party managed device to cloud-based and/or other resources.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A system, comprising:
a communication interface; and
a processor coupled to the communication interface and configured to:
  embed in a registration communication sent from a third party managed device configured to be managed by a third party management entity to an access node associated with a first party management entity a unique identifier of the third party managed device; and send the registration communication sent from the third party managed device to the access node;

wherein the access node is configured to store data associating the unique identifier with the third party managed device, and to use the unique identifier to obtain from the third party management entity device posture information for the third party managed device;

wherein the registration communication is sent by a management agent associated with the first party management entity and wherein the management agent is installed on the third party managed device; and wherein the management agent is configured to publish itself as an authenticator upon successful completion of a registration process with which the registration communication is associated.

2. The system of claim 1, wherein the registration communication comprises a Fast Identity Online (FIDO) registration response.

3. The system of claim 1, wherein the registration communication sent from the third party managed device to the access node associated with the first party management entity is sent at least in part in response to a registration challenge sent to the third party managed device at least in part in response to a communication received by the access node from a first party managed device associated with the first party management entity.

4. The system of claim 3, wherein the first party managed device is configured to send the communication at least in part in response to user input.

5. The system of claim 4, wherein the user input comprises scanning a QR or other code displayed on a display comprising the third party managed device.

6. The system of claim 5, wherein QR or other code encodes information that includes a session identifier.

7. The system of claim 6, wherein the access node is configured to include the session identifier in the registration challenge.

8. The system of claim 4, wherein the third party managed device is paired with the first party managed device via Bluetooth or another protocol, the user input comprises an input entered via the third party managed device, and the communication is sent by the first party managed device at least in part in response to a Bluetooth or other communication sent by the third party managed device to the first party managed device at least in part in response to the user input.

9. The system of claim 8, wherein the Bluetooth or other communication includes a session identifier.

10. The system of claim 1, wherein the processor is configured to embed the unique identifier of the third party managed device in the registration communication at least in part by installing on the third party managed device said management agent associated with the first party management entity.

11. The system of claim 1, wherein the registration communication includes a one-time access (OTA) token sent by the access node to the third party managed device in response to a communication received from a first party managed device associated with a same user with which the third party managed device is associated.

12. The system of claim 1, wherein the access node is configured to store the data associating the unique identifier with the third party managed device in a user record associated with the third party managed device.

13. The system of claim 1, wherein the unique identifier is included in a client data portion or field of the registration communication.

14. The system of claim 1, wherein the unique identifier comprises a physical address.

15. The system of claim 14, wherein the physical address comprises a MAC address.

16. A method, comprising:

embedding in a registration communication sent from a third party managed device configured to be managed by a third party management entity to an access node associated with a first party management entity a unique identifier of the third party managed device; and sending the registration communication sent from the third party managed device to the access node;

wherein the access node is configured to store data associating the unique identifier with the third party managed device, and to use the unique identifier to obtain from the third party management entity device posture information for the third party managed device;

wherein the registration communication is sent by a management agent associated with the first party management entity and wherein the management agent is installed on the third party managed device; and wherein the management agent is configured to publish itself as an authenticator upon successful completion of a registration process with which the registration communication is associated.

17. The method of claim 16, wherein the unique identifier comprises a MAC or other physical address.

18. A computer program product embodied in a non-transitory computer readable medium, the computer program product comprising computer instructions for:

embedding in a registration communication sent from a third party managed device configured to be managed by a third party management entity to an access node associated with a first party management entity a unique identifier of the third party managed device; and sending the registration communication sent from the third party managed device to the access node;

wherein the access node is configured to store data associating the unique identifier with the third party managed device, and to use the unique identifier to obtain from the third party management entity device posture information for the third party managed device;

wherein the registration communication is sent by a management agent associated with the first party management entity and wherein the management agent is installed on the third party managed device; and wherein the management agent is configured to publish itself as an authenticator upon successful completion of a registration process with which the registration communication is associated.

* * * * *